United States Patent [19]
Carpenter

[11] 3,861,163
[45] Jan. 21, 1975

[54] METHOD AND APPARATUS FOR MAKING BLOCK ICE

[76] Inventor: Walter H. Carpenter, Rt. 3, Box 65, Riverview, Fla. 33569

[22] Filed: Dec. 10, 1973

[21] Appl. No.: 423,008

[52] U.S. Cl............................. 62/73, 62/75, 62/353, 62/320
[51] Int. Cl............................. F25c 1/08, F25c 1/24
[58] Field of Search........... 62/75, 73, 351, 353, 71, 62/356, 320

[56] References Cited
UNITED STATES PATENTS

| | | | |
|---|---|---|---|
| 2,546,092 | 3/1951 | Field | 62/73 |
| 2,639,594 | 5/1953 | Watt | 62/71 X |
| 2,747,379 | 5/1956 | Field | 62/351 X |

*Primary Examiner*—William E. Wayner
*Attorney, Agent, or Firm*—Wilmer Mechlin

[57] ABSTRACT

A method and apparatus for making block ice of predetermined dimensions in cycles from a solid column of ice divided vertically into sections relatively outwardly stepped toward the top and formed in a freezing container having correspondingly related freezing compartments, wherein in each cycle the column is lifted to expose a top portion thereof, a finished block is cut and removed from the exposed top portion, open spaces in the freezing compartments are filled with the liquid to be frozen, and the liquid is frozen to the bottom and sides of the column in thin slabs equalling in total volume the finished block. The column supported in lifted position during cutting off of the block and freezing of the slabs by ice bonds substantially instantaneously frozen between confronting, vertically overlapping surfaces of the sections and compartments and subsequently melted in freeing the column from the container for lifting in the next cycle.

11 Claims, 7 Drawing Figures

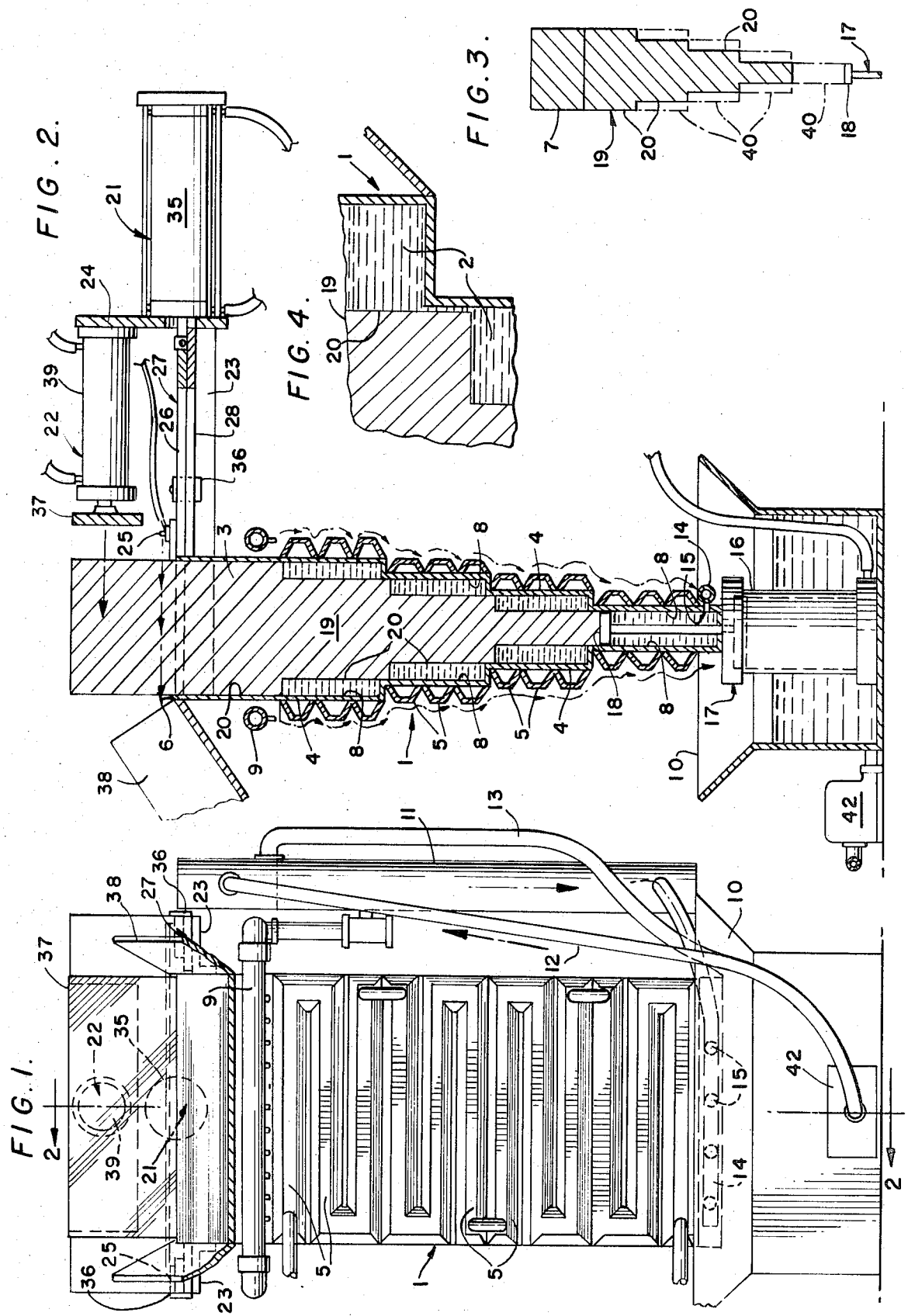

METHOD AND APPARATUS FOR MAKING BLOCK ICE

BACKGROUND OF THE INVENTION

As in the U.S. Pat. Nos. 2,471,655 to Rundell and 2,546,092, to Field it has previously been recognized that because of the relatively low heat transfer coefficient of ice, a block of ice composed of separately frozen thin layers or slabs can be produced much more rapidly than a solid block of the same total thickness. However, the continuous production of a finished block from separately frozen layers has presented problems. The solution proposed by Rundell is to produce each layered block in an inverted frusto-conical freezing container by lifting a previously frozen interior in stages from the container by mechanical means and freezing on another outer layer in each stage, with the frozen interior supported by the lifting means during the freezing. By contrast, in Field the layers of a finished block are separately and simultaneously frozen as thin annular slabs in superimposed compartments of a freezing container which are relatively outwardly stepped toward either the top or the bottom. After release from their compartments, the annular slabs are moved into interfitting relationship at the same top or bottom level, with purported regelation of their adjoining surfaces to form the finished block. Thus, whether progressively layered in stages or the layers are simultaneously frozen and interfitted in a single stage, in both Rundell and Field removal of the finished block denudes the container of ice and the next block must be frozen in whole in a separate operation. It is with an improved method and apparatus for making block ice from separately frozen thin slabs that the present invention is concerned.

SUMMARY OF THE INVENTION

The primary object of the invention is to provide an improved method and apparatus for making frozen liquid in a freezing container from a solid column of frozen liquid divided vertically into a plurality of sections relatively outwardly stepped toward the top, by cutting and removing a finished block of predetermined dimensions from the top portion, while replacing the volume removed by the block by freezing thin slabs to the bottom and sides of sections of the column.

Another object of the invention is to provide an improved method and apparatus for continuously making block ice in cycles from a solid column of ice divided vertically into a plurality of sections relatively outwardly stepped toward the top and formed in a freezing container correspondingly divided into freezing compartments, wherein the column in each cycle is lifted by substantially the height of the finished block leaving a slight vertical overlap between confronting surfaces of each section and the compartment from which it was lifted, a block of predetermined dimensions is cut from the top portion of the column while replacing the volume so removed by freezing thin slabs in the container to the bottom and sides of the column, and after lifting the column is supported in lifted position by ice bonds frozen between the overlapping confronting surfaces of the sections and compartments.

An additional object of the invention is to provide a method and apparatus of the character described in the preceding object, wherein the thin slabs are frozen by externally refrigerating sides of the freezing compartments of the container by a refrigerant pumped through coils on the sides, the column is released from the container for lifting by defrosting the coils by a liquid of which the slabs are frozen, and the defrosting liquid is introduced as pre-chilled liquid into the freezing compartments for reducing the time required to freeze the thin slabs.

A further object of the invention is to provide improved apparatus for making block ice in cycles from a solid ice column divided vertically into sections relatively outwardly stepped toward the top and formed in a freezing container having correspondingly related freezing compartments, by in each cycle lifting the column substantially the height of a finished block and cutting a block of predetermined dimensions from a top portion of the column while replacing the volume so removed by freezing thin slabs on to lower portions of the column, wherein in each cycle an electrically heated wire positioned above and reciprocable horizontally across the top of the container cuts a block from the top portion of the column for subsequent removal therefrom.

Other objects and advantages of the invention will appear hereinafter in the detailed description, be particularly pointed out in the appended claims, and be illustrated in the accompanying drawings, in which:

FIGURE DESCRIPTION

FIG. 1 is a front elevational view of a preferred embodiment of the improved apparatus of the present invention.

FIG. 2 is a vertical sectional view taken along lines 2—2 of FIG. 1.

FIG. 3 is a schematic view of the solid ice column from which a block of ice is cut in each cycle showing a block cut from the top portion of the column and in dotted line thin slabs of the same total volume frozen to the bottom and sides of the column.

Figure 5:
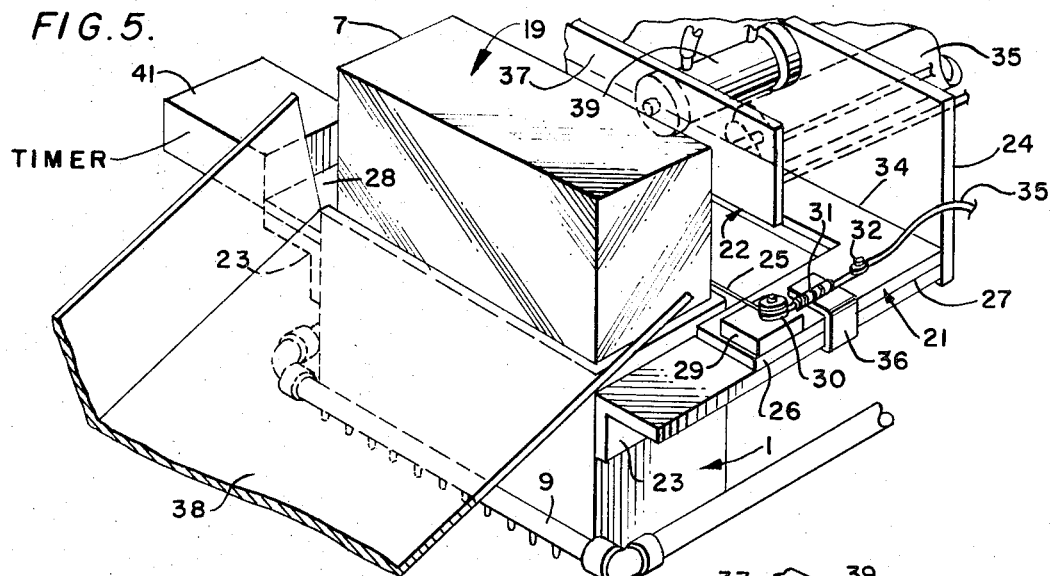
Figure 6:
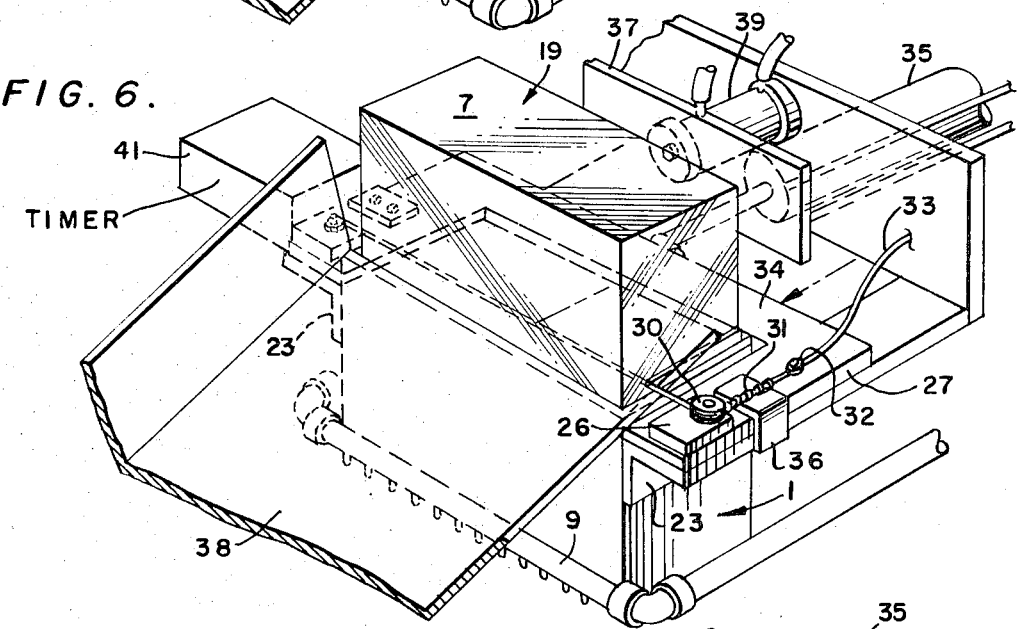
Figure 7:
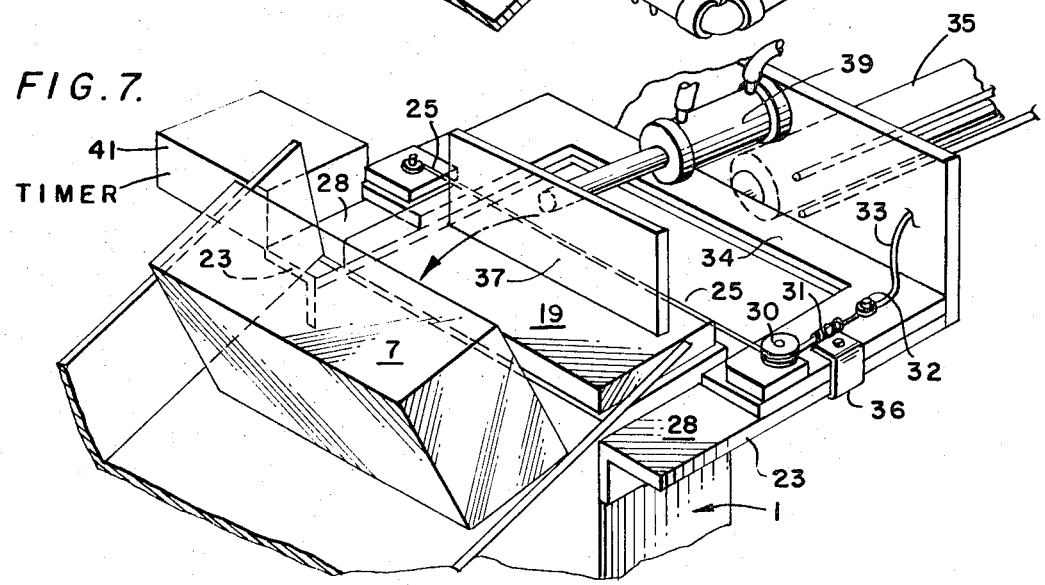

FIG. 4 is a fragmentary sectional view on a section of FIG. 2 and an enlarged scale showing the relation on lifting between a corner of a section of the ice column and the overlapping portion of the freezing compartment from which the section was lifted, and FIGS. 5, 6 and 7 are perspective views of an upper part of the improved apparatus showing respectively a top portion of the ice column lifted above the freezing container in position for severing a block of ice therefrom, a block partly severed from the top portion of the column and a severed block pushed from the column into a discharge chute.

DETAILED DESCRIPTION

Referring now in detail to the drawings in which like reference characters designate like parts, the improved method and apparatus of the present invention, while capable of producing blocks of other congealed liquids, is particularly adapted for producing blocks of ice from water and will be so specifically described as exemplary of the invention.

The improved apparatus is comprised of a vertical container 1 divided vertically into a plurality of freezing compartments 2 relatively outwardly stepped toward the top and preferably also has a non-freezing holding compartment 3 surmounting or extending upwardly from and of substantially the same dimensions as the top freezing compartment. Desirably constructed of metal of high heat conductivity, such as aluminum, the container has the side walls 4 of its freezing compartments 2 externally exposed or presented to or contactable with a suitable refrigerant and for compactness preferably has freezing or refrigerating coils mounted externally on the compartment side walls and connected to a compressor (not shown) for supply of freon, ammonia or like fluid refrigerant or freezing medium.

As is well known, the heat conductivity or heat transfer coefficient of water decreases on freezing, with the result that a slab or layer of a thickness of about one-half inch can be frozen on a freezing surface in about 20 minutes, while to freeze on the same surface a layer about 2 inches thick would take some 4 hours. This principle is availed of in the present apparatus by vertically aligning or centering the several compartments 2 and 3, with the inside width of the bottom freezing compartment about 1 inch to limit the ice thickness from a refrigerated side wall to about one-half inch, and outwardly stepping each freezing compartment relative to the next lower compartment by the same increment of about 1 inch, again with the ice thickness from a refrigerated side wall limited to about one-half inch.

Opening upwardly onto each other, the holding compartment 3 and the open top 6 of the container 1, the freezing compartments 2 may be cylindrical with each surrounded by an adjoining portion of the freezing coils 5. However, for more efficient use of packing and storage space, it is preferred that the blocks of ice 7 produced by the apparatus be a rectangular hexagon or parallelepiped, rectangular in both horizontal and vertical cross-sections. To achieve this, the freezing and holding compartments are rectangular in cross-section, with the about 1 inch outward stepping of each freezing compartment relative to a next lower divided or distributed equally between a pair of opposite sides of the compartment and the freezing coils 5 limited to the corresponding sides of the container 1. The preferred shape of the compartments not only is advantageous in the packing and storing of the product blocks, but, with cold applied only to a pair of opposite side walls 4, restricts the time-limiting thickness of ice build-up to the widths of the compartments and enables all of the compartments to be of any desired uniform length without affecting the time required to produce the final or finished ice block 7.

With the freezing medium applied through the freezing coils 5 on opposite sides of the freezing compartments 2, the container 1, for periodically defrosting the coils and correspondingly warming the inner or freezing side surfaces 8 of the freezing compartments 2, is fitted externally with defrosters or heaters preferably in the form of multi-jetted or nozzled defrosting pipes or tubes 9 mounted on the same sides of the container for spraying downwardly over the coils a relatively warm warming or defrosting liquid. For collecting the defrosting liquid as it completes its downward flow over the freezing coils 5, the improved apparatus has below the bottom of the container 1 an open-topped sump or collector tank 10.

The water or other liquid for the apparatus conveniently is supplied from a vertical supply tank 11 mounted on a side of the container 1 unoccupied by the freezing coils 5 and vertically spanning or including and extending above and below the plurality of freezing compartments 2. In turn supplied above the level of the top freezing compartment 2 with a mixture of defrosting and make-up water pumped to it from the sump 10 through a supply pipe 12, the supply tank 11 maintains the water therein at a constant height or level slightly above the top of the top freezing compartment, by having at that level an upper end of an overflow pipe 13 leading downwardly to the sump. For supplying water to the container 1, the supply tank has connected to a bottom portion thereof a fill pipe or manifold 14 extending along a freezing side of the bottom freezing compartment 2 and having spaced therealong a plurality of nozzles 15 opening into the bottom compartment. As its supporting base within the sump 10, the illustrated freezing container 1 has a cylinder or casing 16 of a suitably fluid-actuated lifting piston of jack 17, whose head 18 is contained and reciprocable vertically in the bottom freezing compartment 2 from a retracted position in the bottom of the compartment to an advanced position slightly below the top of the compartment.

Forming within its freezing compartments 2 of the container 1 in the manner hereinafter to be described, a solid ice column 19 divided vertically into sections 20 relatively outwardly stepped toward the top or upwardly in correspondence or conformance with the relative outward stepping of the freezing compartments 2, the apparatus is adapted in stages to lift or project a top portion of the ice column above the container and cut off and remove therefrom the previously mentioned ice block 7. For performing these cut-off and removal functions, the improved apparatus has mounted on the upper portion of the container 1 separate, sequentially operating block-cutting or severing and removing devices 21 and 22, respectively. The illustrated cutting and removing devices have a common mounting, suitably in the form of a pair of angle irons 23 fixed to and extending horizontally along opposite sides or side walls of the holding compartment 3 below and adjacent the container's open top 6 and a connecting or mounting plate 24 horizontally spaced from and substantially parallel to an intermediate side of the container and fixed to and connecting correspondingly projecting ends of the angle irons.

The preferred severing device 21 has as its cutting or severing means an electrically heated wire 25 carried by and extending between outer or distal end portions of arms 26 of a yoke 27 horizontally including an intermediate side and embracing opposite sides of the container 1, with the arms supported and slideable longitudinally on upper horizontal flanges 28 of the angle irons 23 and friction between the relatively sliding confronting surfaces preferably minimized, as by applying an anti-friction coating, such as TEFLON, to the under-surfaces of the yoke arms. Electrically insulated from the arms 26, as by insulating blocks 29 fixed to and surmounting the distal portions thereof, the illustrated severing wire 25 is anchored at one end to the block on one of the arms. For maintaining it taut or taking up slack, the wire 25 rides over a free-turning take-up spool 30 on the block on the other arm and has its end therebeyond connected to one end of a tension spring 31 whose opposite end is anchored to a binding post 32 electrically insulated from the arm and fixed thereto rearwardly of the spool. Current for heating the wire is supplied from a suitable source (not shown), conveniently through an electrical lead 33 connected to the binding post 32.

Extending horizontally parallel to the intermediate side of the container 1 included by the yoke 27 and spaced vertically above the container's top 6 sufficiently to clear the latter, the severing wire 25 is designed to be swept or carried by the yoke across the container's top and in process cut an ice block 7 of predetermined dimensions from the top portion of the ice column 19 projecting above the container 1. Illustrated as normally or at rest positioned beyond the side of the column 19 confronting the mounting plate 24 and web 34 of the yoke 27, the severing wire 25 in cutting off a block is moved by the yoke from that side to the opposite side of the container, and after removal of the block, returned to normal position by retraction of the yoke, with the impetus for both advancing and retracting the yoke supplied by a fluid-actuated piston 35 mounted on the outside of the mounting plate 24 and therethrough centrally connected to the yoke's web 34, and the arms 26 suitably guided on the upper flanges 28 of the angle irons or angle mounting brackets 23, as by guide clips 36 on the arms and vertically overlapping the outer edges of the flanges.

The preferred removing device 22, for removing or ejecting a block 7 after it has been cut from the ice column 19, has a push plate 37 paralleling and in retracted position normally spaced from the side of the ice column 19 confronted by the severing wire in the latter's retracted position and positioned to engage that side above the wire. By sweeping or advancing across the container's top 6, the push plate 37 pushes a severed block off the then top of the ice column 19 onto a discharge chute 38 down which the finished block slides to a suitable packing device (not shown). A separate fluid-actuated piston 39 mounted on the inside of the mounting plate 24 above and acting horizontally parallel to the severing wire piston 35, powers the advance and retract strokes of the push plate 42. The relative duration and sequences of these and the other steps in each stage of operation of the improved apparatus are controlled by a suitable timer 41 conveniently mounted on a side of the container 1, as indicated by the block so labelled in FIG. 6.

While, as illustrated, cutting off a block in its advance stroke, the severing wire 25 is equally adapted for normal positioning at the end of its advance stroke and cutting off a block in its retract stroke, thereby avoiding any need for shielding the wire in its advanced position by the adjoining end of the discharge chute 38 against breakage by a finished block during discharge thereof into the chute.

As pointed out earlier, for producing a block of ice in a cycle or stage of the intended short duration, the illustrated rectangular cross-section freezing compartments 2 may be of any desired uniform length, but the bottom compartment should have a width of about 1 inch between its opposite freezing surfaces 8 and the higher or upper compartments should increase relatively in width by increments of about 1 inch divided equally between their opposite sides or freezing surfaces. While the incremental increase of about 1 inch in width cannot be exceeded, except at the expense of a rapid and disproportionate increase in the time required for each stage, the freezing container 1 can have as many freezing compartments 2 as needed to produce a finished block of the desired multiple of 1 inch in width or thickness. Also, for cyclic upward projection and rebuilding of the ice column 19 the freezing compartments 2 should be of substantially uniform free heights, as measured in the case of the bottom compartment from the top of the piston head 8 with the latter in retracted position.

In practicing with the above-described improved apparatus, the improved method of the present invention for making block ice or other frozen liguid, as previously indicated, the method is performed in cycles or stages, in each of which a block of ice of predetermined dimensions is produced or harvested from the top portion of the solid ice column 19 and the volume so removed is replaced replenished or compensated for by freezing thin slabs 40 to the bottom and sides of the column in the freezing compartments 2 of the container 1 in which the column is formed.

Using the described apparatus, at the end of each cycle or stage after the harvesting or cutting off and removal of a block 7, the apparatus will have within the container 1 a solid column of ice divided vertically into sections 20 relatively outwardly stepped in width and preferably uniform in length and of rectangular cross-section and also substantially uniform in height, except that the height of the top section will be doubled by including the then top portion in the non-freezing holding compartment 3 and the portion in the top freezing compartment, each of which portions will be of substantially the dimensions of the product block. With both the freezing container 1 and the solid ice column 19 vertical or upright and preferably parallel-sided and the column initially or at the start filling the container, each cycle or stage in the improved method includes the following steps controlled in their durations and relative sequences by the timer 41:

1. Defrosting to free the ice column from freezing surfaces of the container;
2. Lifting or upwardly projecting the ice column by the lift piston 17 by a distance substantially equal to the desired height of a finished ice block 7 to project the top portion above the container's top 6 and each section 20 into the next higher freezing or holding compartment 2 or 3;
3. Filling the open spaces in the freezing compartments with the water or other liquid of which the column is frozen;
4. Freezing the liquid in each freezing compartment as thin slabs to the bottom or sides of the column;
5. Retracting the lifting piston; and
6. Harvesting a block of predetermined dimensions by cutting off and removing the block from the exposed top portion of the ice column.

As performed on the disclosed apparatus, the defrosting to warm the freezing surfaces 8 in the freezing compartments 2 and, by surface melting slightly space the confronting or adjoining sides of the column from those surfaces, is performed by spraying the water or other liquid from the defrosting pipes 9 downwardly over the freezing coils 5 to the sump 10. In the same apparatus, the filling of open spaces in the freezing compartments 2 with the liquid to be frozen is by a gravity fill from the supply tank 11 through the fill pipe 14 opening into the bottom compartment. The filling takes place as the ice column 19 is lifted by the lift piston 17, with a suction assist from both the piston and the column. That the spaces will be completely filled in the lifted position of the column is assured by their clearances between confronting sides of the column and freezing compartments and maintenance of the liquid level or head in the supply tank at a constant level above the top freezing compartment by liquid pumped by the sump pump 42 from the sump 10 and with any excess liquid returned to the sump through the overflow pipe 13.

The freezing step follows immediately on the filling step, and, since a lifting piston 17 cannot be retracted in the presence of a frozen slab in the bottom compartment, provision is made for rendering the column self-supporting almost instantaneously on initiation of the freezing step so that the piston can be retracted substantially at the outset of that step. This is accomplished by so limiting the lifting of the ice column as to leave a slight vertical overlap between each column section 20 and the freezing compartment 2 from which it was projected and, by the almost instantaneous freezing of the thin film of liquid between the vertically overlapping surfaces, forming the ice bonds therebetween. While sufficiently strong to support the ice column, these ice bonds, since of relatively small area, will rupture as needed to accommodate any upward expansion in the freezing compartments 2 as the liquid in the open spaces is frozen.

Of the several steps of a cycle, the defrosting or warming of the freezing surfaces 8 to free or release the ice column 19 therefrom, must precede the lifting, and, as above noted, the lifting piston 17 must be retracted before the liquid in the bottom compartment 2 is frozen. However, the remaining steps can be performed concurrently with one or another of the other steps. Thus, both retraction of the lifting piston and the two-stage harvesting of the product ice block 7 are performed during the freezing step, which of all is of the longest duration, and the lifting and filling stages are essentially concurrent. Consequently, the time required for a complete cycle is only the total of the necessarily successive steps, defrosting, lifting and freezing. For a typical operation, this total is about 20 minutes, of which 18 ½ minutes is consumed by the freezing, somewhat less than 1 ½ minutes by the defrosting and the few seconds balance by the lifting. Within this total in the same typical operation, the severing part of the harvesting step will take about 2 minutes, and the removal of a severed block about a few seconds and the lifting piston 17 will be retracted about a minute after the freezing step has begun. Since the most time-consuming factor is the freezing of the slabs, so long as the slab thickness from each freezing surface is held to about one-half inch, the time required for a cycle will be substantially the same, regardless of the number and heights and lengths of the freezing compartments 2, thus enabling the product blocks 7 to be of any suitable dimensions.

Once the freezing container 1 is filled with a solid ice column 19, the method can proceed or continue cyclically for as long a production run as desired, with the times for the cycles the same and no problems of interfitting the volume-replacing slabs 40 with or freezing them to a previously frozen ice column in the latter's lifted position, since the slabs are confined during freezing in definite spaces and frozen while exposed to the column. However, if the freezing container is filled only with the water or other liquid to be frozen at the beginning of a production run, it is necessary to form the ice column before the short cycles are obtainable. With the illustrated five compartments all filled with water, it takes some five cycles or about 100 minutes before the container is filled with an ice column and a production run can begin. In the first of these cycles a thin core slab will be frozen in the bottom compartment and the side slabs will be added at the sides in each succeeding cycle as the core slab and any previously added side slabs reach their compartment.

From the above detailed description, it will be apparent that there has been provided an improved method and apparatus for continuously making block ice from a solid ice column in cycles each of shorter duration and consuming far less power than required for freezing a block of the same dimensions in a single step, thus suiting the invention for use in almost any country. It should be understood that the described and disclosed embodiments are merely exemplary of the invention and that all modifications are intended to be included that do not depart from the spirit of the invention and the scope of the appended claims.

Having described my invention, I claim:

1. A method of making frozen liquid blocks, comprising forming a frozen liquid vertical solid column substantially rectangular in horizontal cross-section and divided vertically into a plurality of sections relatively outwardly stepped toward the top only between one pair of opposite sides of said column, and cutting of and removing a frozen block from a top portion of said column while replacing the volume of said block by freezing thin slabs of said liquid to said sides and a bottom of said column below said top portion.

2. A method according to claim 1, wherein the cutting off and removing and replacing of the removed volume are steps of a repetitive cycle in a continuous production run, and each cycle includes as a step lifting the column to expose the top portion thereof for cutting off and removing a block.

3. A method according to claim 2, wherein the frozen liquid is ice and the replacement liquid water.

4. A method according to claim 3, wherein the solid ice column is formed in a vertical container having vertically aligned freezing compartments correspondingly outwardly stepped toward the top, and each cycle includes the steps of warming freezing surfaces of said freezing compartments for freeing the column therefrom, lifting the column to expose the top portion thereof above said container and projecting each section into a next higher compartment with a relatively slight vertical overlap between confronting surfaces thereof and an adjoining lower compartment, filling with water open spaces in said freezing compartments below and at sides of the column sections, freezing said water as thin slabs to said column, and cutting off and removing from the top portion of the column a block of ice of predetermined dimensions and substantially the same volume as the total volume of said slabs frozen to the column within said freezing compartments, while supporting said column in lifted position after the start of the freezing step by ice bonds between said vertically overlapping surfaces of said column sections and freezing compartments.

5. Apparatus for making block ice from a vertical solid column of ice divided vertically into a plurality of vertically aligned sections relatively outwardly stepped toward the top, comprising an open-topped freezing container divided vertically into a plurality of freezing compartments correspondingly outwardly stepped toward the top, freezing surfaces at sides of said freezing compartments, means for alternately applying a refrigerant to and warming said freezing surfaces, means operative on said warming for lifting said column to project the top portion thereof above said container and limitedly project each section thereof into a next higher compartment for leaving a relatively slight overlap between confronting surfaces of each section and freezing surfaces of an adjoining lower freezing compartment, means for filling with water open spaces between said column sections and said freezing compartments, said vertically overlapping confronting surfaces on application of refrigerant to said freezing surfaces with said spaces filled causing ice bonds to form therebetween for supporting said column in lifted position during freezing of the remaining water, and means for sequentially cutting off and removing a block of ice from said top portion of said column.

6. A method according to claim 1, wherein each column section is of uniform horizontal cross-section.

7. Apparatus according to claim 6, wherein the means for applying a refrigerant to the freezing surfaces are freezing coils mounted externally on the container, and the means for warming the freezing surfaces are pipe means mounted externally on the container above the freezing coils for spraying water for downward flow over said freezing coils, and including a sump below the container for collecting the water flowed over the coils, and a vertical supply tank at a side of the container and vertically spanning the freezing compartments therein for supplying water for filling open spaces in the freezing compartments, said supply tank being filled from said sump and including means for maintaining the water level therein above the top of the top freezing compartment for gravity fill of the freezing compartments.

8. Apparatus according to claim 7, wherein the lifting means is a fluid-actuated jack having a head in and reciprocable substantially the height of the bottom freezing compartment.

9. Apparatus according to claim 6, wherein the means for sequentially cutting off and removing a block of ice from the top portion of the column are respectively a horizontal electrically heated cutting wire extending beyond and reciprocably horizontally across the top of the container, and a push plate normally retracted from a side of the container and reciprocable horizontally thereacross above the cutting wire.

10. Apparatus according to claim 8, wherein the ice column and freezing container are rectangular in horizontal cross-section, the freezing surfaces are limited to pairs of corresponding opposite sides of the freezing compartments, and the means for sequentially cutting off and removing a block of ice from the top portion of the column are respectively a horizontal electrically heated cutting wire extending beyond and reciprocably horizontally across the top of the container, and a push plate normally retracted from a side of the container and reciprocable horizontally thereacross above the cutting wire.

11. Apparatus according to claim 6, wherein the lifting means is a jack having a head shiftable between advanced and retracted positions in the bottom freezing compartment and dependent for retractability upon support of the ice column in lifted position by the ice bonds formed between the vertically overlapping confronting surfaces.

* * * * *